US008160394B2

(12) United States Patent
Acree et al.

(10) Patent No.: US 8,160,394 B2
(45) Date of Patent: Apr. 17, 2012

(54) REAL-TIME CAPTURE AND TRANSFORMATION OF HEMISPHERICAL VIDEO IMAGES TO IMAGES IN RECTILINEAR COORDINATES

(75) Inventors: Elaine S. Acree, Madison, AL (US); Sheila G. Whitaker, Gurley, AL (US); Gene A. Grindstaff, Decatur, AL (US)

(73) Assignee: Intergraph Software Technologies, Company, Las Vegas, NV (US)

( * ) Notice: Subject to any disclaimer, the term of this patent is extended or adjusted under 35 U.S.C. 154(b) by 1133 days.

(21) Appl. No.: 11/432,774

(22) Filed: May 11, 2006

(65) Prior Publication Data
US 2007/0263093 A1 Nov. 15, 2007

(51) Int. Cl.
*G06K 9/32* (2006.01)
(52) U.S. Cl. ....................................... 382/293
(58) Field of Classification Search .................. 382/293
See application file for complete search history.

(56) References Cited

U.S. PATENT DOCUMENTS

| 5,508,734 | A * | 4/1996 | Baker et al. ............... 348/36 |
| 6,005,611 | A | 12/1999 | Gullichsen et al. ........ 348/211 |
| 6,492,985 | B1 | 12/2002 | Mutz et al. ............... 345/419 |
| 6,603,502 | B2 | 8/2003 | Martin et al. ............. 348/36 |
| 6,687,387 | B1 | 2/2004 | Molnar et al. ............ 382/107 |
| 6,778,211 | B1 | 8/2004 | Zimmermann et al. ... 348/218.1 |
| 6,795,113 | B1 | 9/2004 | Jackson et al. ........... 348/207 |
| 7,015,949 | B1 | 3/2006 | Sah .......................... 348/207.1 |
| 7,024,488 | B1 | 4/2006 | Sah .......................... 709/240 |
| 7,076,085 | B1 | 7/2006 | Sah .......................... 382/107 |
| 7,177,448 | B1 | 2/2007 | Sah .......................... 382/107 |
| 7,312,820 | B2 | 12/2007 | Zimmermann et al. ... 348/218.1 |
| 7,382,399 | B1 | 6/2008 | McCall et al. ............ 348/207.99 |
| 2002/0097280 | A1 * | 7/2002 | Loper et al. ............... 347/2 |
| 2003/0103063 | A1 | 6/2003 | Mojaver et al. ........... 345/647 |
| 2004/0088732 | A1 | 5/2004 | Martin et al. ............. 725/105 |
| 2004/0105597 | A1 * | 6/2004 | Lelescu et al. ............ 382/276 |
| 2004/0218235 | A1 * | 11/2004 | Kawano .................... 358/505 |

(Continued)

FOREIGN PATENT DOCUMENTS
WO WO 2005/013001 2/2005

OTHER PUBLICATIONS

Bourke, Paul, "Computer Generated Angular Fisheye Projections," [On-Line] May 2001, Retrieved from the Internet: http://local.wasp.uwa.edu.au/~pbourke/projection/fisheye/> [retrieved on Feb. 8, 2008] 11 pages.

(Continued)

*Primary Examiner* — Brian Werner
*Assistant Examiner* — Nirav G Patel
(74) *Attorney, Agent, or Firm* — Sunstein Kann Murphy & Timbers LLP (57) ABSTRACT

A method of transforming an input image from a hemispherical source to an output image in rectilinear coordinates is disclosed. The method includes receiving data representative of an input image originating from a hemispherical camera and having a size defined by an input image height and an input image width. Once the data is received, an output image width and output image height representative of a size of a rectilinear output image is calculated based on the size of the input image. A rectilinear output image is then generated by mapping input image pixels to locations within the width and height of the output image, without reference to the optical characteristics of the hemispherical camera.

32 Claims, 10 Drawing Sheets

U.S. PATENT DOCUMENTS

| | | | | |
|---|---|---|---|---|
| 2005/0058360 | A1* | 3/2005 | Berkey et al. | 382/254 |
| 2005/0062869 | A1 | 3/2005 | Zimmermann et al. | 348/335 |
| 2005/0259118 | A1* | 11/2005 | Mojaver et al. | 345/647 |
| 2006/0023105 | A1* | 2/2006 | Kostrzewski et al. | 348/335 |
| 2006/0028548 | A1 | 2/2006 | Salivar et al. | 348/143 |
| 2006/0028550 | A1 | 2/2006 | Palmer, Jr. et al. | 348/155 |
| 2006/0033813 | A1 | 2/2006 | Provinsal et al. | 348/143 |
| 2007/0183681 | A1* | 8/2007 | Li et al. | 382/261 |
| 2007/0188653 | A1 | 8/2007 | Pollock et al. | 348/373 |

OTHER PUBLICATIONS

Atkins, Bob, "Field of View-Rectilinear and Fishye Lenses" [On-Line] Nov. 16, 2004, Retrieved from the Internet: http://www.bobatkins.com/photography/technical/field_of_view.html> [retrieved on Feb. 18, 2008] 7 pages.

Wikipedia: "Map Projection" [On-Line] Nov. 25, 2005, Retrieved from the Internet: http://web.archive.org/web/20051125040916/http://en.wikipedia.org/wiki/Map_projection> [retrieved on Feb. 18, 2008] 10 pages.

Authorized Officer: Reise, Berit, *The International Search Report and the Written Opinion of the International Searching Authority*, International Application No. PCT/US2007/068162, International Searching Authority, Feb. 18, 2008.

Hall, et al, A Televiewing Systems for Multiple Simultaneous Customized Perspectives and Resolutions, *Computer Vision and Robotics Research Laboratory, University of California; IEEE* Aug. 2001.

Leonard McMillan, Jr., An Image-Based Approach to Three-Dimensional Computer Graphics, *University of North Carolina*, Chapel Hill, 1997.

Liu, et al, Real-Time Warps for Improved Wide-Angle Viewing, *Microsoft Research Technical Report*, MSR-TR-2002-10, Nov. 2002.

Thomas, Geb, *Real-Time Panospheric Image Dewarping and Presentation for Remote Mobile Robot Control*, The University of Iowa, 17 pages (2003).

Nikon Corporation, Nikon CaptureNX Catalog, UPoint Technology, 4 pages (Feb. 2006).

Shum, Heung-Yeung, et. al, *Panoramic Image Mosaics*, Microsoft Research Technical Report, MSR-TR-97-23, 53 pages (Sep. 1997).

Ryoo, Seung-Taek, et. al, *Full-View Panoramic Navigation Using Orthogonal Cross Cylinder*, Department of Image Engineering, ChungAng University, Seoul, Korea, 8 pages (Feb. 2002).

Heidrich, Wolfgang, *Environment Maps and Their Applications*, Max-Planck-Institute for Computer Science, Saarbrücken, Germany, 19 pages (2000).

Johnson, Keith, *Development of a Versatile Wide-Angle Lens Characterization Strategy for Use in the Omnister Stereo Vision System*, A Thesis Presented for the Master of Science Degree, The University of Tennessee, 88 pages (Dec. 1997).

Kannala, Juho, et. al, *A Generic Camera Calibration Method for Fish-Eye Lenses*, Helsinki University of Technology, Laboratory of Computational Engineering, Finland, 4 pages (Aug. 2004).

EPSG Members, *Coordination Conversions and Transformations Including Formulas* (POSC Literature), European Petroleum Survey Group (EPSG), 76 pages (Jan. 2004) [Revised Apr. 2009].

* cited by examiner

| Row[0] Column[0] | | | | | | | | | |
|---|---|---|---|---|---|---|---|---|---|
| (A0, B0) | (A0, B1) | (A0, B2) | (A0, B3) | (A0, B4) | (A0, B5) | (A0, B6) | (A0, B7) | (A0, B8) | (A0, B9) |
| (A1, B0) | (A1, B1) | (A1, B2) | (A1, B3) | (A1, B4) | (A1, B5) | (A1, B6) | (A1, B7) | (A1, B8) | (A1, B9) |
| (A2, B0) | (A2, B1) | (A2, B2) | (A2, B3) | (A2, B4) | (A2, B5) | (A2, B6) | (A2, B7) | (A2, B8) | (A2, B9) |
| (A3, B0) | (A3, B1) | (A3, B2) | (A3, B3) | (A3, B4) | (A3, B5) | (A3, B6) | (A3, B7) | (A3, B8) | (A3, B9) |
| (A4, B0) | (A4, B1) | (A4, B2) | (A4, B3) | (A4, B4) | (A4, B5) | (A4, B6) | (A5, B6) | (A4, B8) | (A4, B9) |
| (A5, B0) | (A5, B1) | (A5, B2) | (A5, B3) | (A5, B4) | (A5, B5) | (A5, B6) | (A5, B7) | (A5, B8) | (A5, B9) |
| (A6, B0) | (A6, B1) | (A6, B2) | (A6, B3) | (A6, B4) | (A6, B5) | (A6, B6) | (A6, B7) | (A6, B8) | (A6, B9) |
| (A7, B0) | (A7, B1) | (A7, B2) | (A7, B3) | (A7, B4) | (A7, B5) | (A7, B6) | (A7, B7) | (A7, B8) | (A7, B9) |
| (A8, B0) | (A8, B1) | (A8, B2) | (A8, B3) | (A8, B4) | (A8, B5) | (A8, B6) | (A8, B7) | (A5, B6) | (A8, B9) |
| (A9, B0) | (A9, B1) | (A9, B2) | (A9, B3) | (A9, B4) | (A9, B5) | (A9, B6) | (A9, B7) | (A9, B8) | (A9, B9) |

REAL-TIME CAPTURE AND TRANSFORMATION OF HEMISPHERICAL VIDEO IMAGES TO IMAGES IN RECTILINEAR COORDINATES

FIELD OF THE INVENTION

The invention generally relates to the capture and processing of live streaming images. More specifically, the invention relates to the real time transformation of images captured using a hemispherical camera to rectilinear images.

BACKGROUND ART

Surveillance systems are used in a number of security applications to monitor buildings, equipment, and other locations of importance. Some systems use standard cameras that produce rectilinear images. Rectilinear images are undistorted wherein the coordinates are made up of right lines. Additionally, a single rectilinear image needs only a minimum amount of processing, if any, before being displayed to the viewer. Although these systems produce undistorted images, the field of view of standard cameras is limited. Therefore, a surveillance system may require numerous cameras to cover the entire area of interest. Adding additional cameras increases the complexity and cost of the surveillance system. Further, in many instances, the system must merge the images coming from the multiple cameras into a single panoramic style image.

Figure 2:
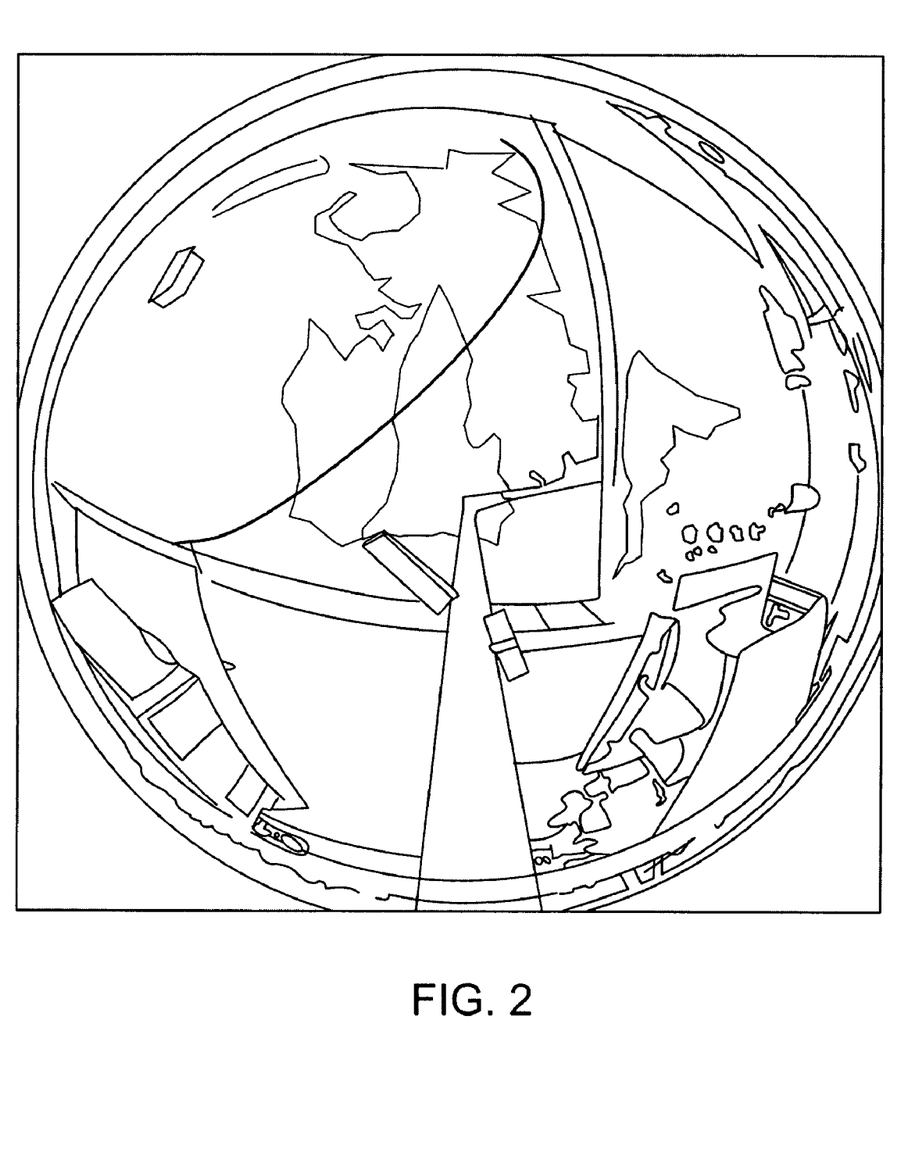
FIG. 2 shows an example of a hemispherical input image.

To avoid the complexity and cost problems associated with multiple standard camera systems, other surveillance systems use hemispherical cameras with a "fish-eye" lens to create a hemispherical image. Hemispherical cameras and the resulting hemispherical images provide a much wider field of view as compared to standard cameras capturing rectilinear images. The wider field of view means that the number of required cameras may be reduced. In addition, using hemispherical cameras eliminates the task of merging multiple images to create a single image of the area of interest. The drawback to hemispherical images is that they are somewhat distorted, making monitoring and detection more difficult. As shown in FIG. 2, objects in hemispherical images tend to have a flattened appearance. Objects within the image, especially those at the edges of the image, are distorted.

To aide in monitoring and detection, several prior art systems exist that transform a distorted hemispherical image into a rectilinear image. The resulting rectilinear image is provides a less distorted view of the area of interest. One such prior art system generates panoramic views from Omni Directional Video Sensors (ODVS). The ODVS is a standard video camera directed towards an optical mirror. The camera captures the hemispherical reflection off of the mirror to generate a hemispherical image. This prior art system uses algorithms to transform the incoming ODVS image into a rectilinear image. The prior art system then displays the rectilinear image to the user. The drawback of this system is that the algorithms used rely on the optical characteristics of the camera and lens. Specifically, the algorithm requires knowledge of the focal lengths of the camera, and the shape and angular characteristics of the lens. Therefore, if a given camera or lens needs to be changed, the algorithms must be adjusted accordingly.

In addition to the above mentioned prior art, there are several prior art software packages that are capable of transforming a hemispherical image into a rectilinear image. One example of such a product is titled Capture Software 4.0 and is produced by Nikon. These software packages are only meant for post-processing transformation and many work only with images taken with certain types of cameras having particular optical characteristics. For example, Capture Software 4.0 specifically works with Nikon Digital SLR cameras.

Although all of the above prior art systems are capable of providing a rectilinear image, whether the image starts as a rectilinear image or a hemispherical image, all suffer from limitations and drawbacks. None of the systems are capable of easily producing a real time, wide viewing area, rectilinear image that is independent of the optical characteristics of the camera.

SUMMARY OF THE INVENTION

In accordance with preferred embodiments of the present invention, a system and method is provided for the capture of live streaming images from a hemispherical camera and transformation of the captured image to a rectilinear image. The transformation is in real time and independent of the optical characteristics of the camera and lens.

In accordance with one embodiment of the invention, the method of transforming hemispherical input image into a rectilinear output image includes receiving data representative of the input image, calculating the width and height of the output image and generating the rectilinear output image. The received data originates from a hemispherical camera and has a size defined by an input image height and width. The rectilinear output image is generated by mapping each of the pixels within the input image to a location within the dimensions of the output image.

The method of transforming the hemispherical input image may also include generating a look-up table containing designated locations of the input image pixels and corresponding locations within the output image. The look-up table may be generated by calculating an inverse mapping for each input pixel by determining the location (i.e. the column and row) of each input pixel. A look-up table index may also be calculated for each input image pixel. The look-up table may associate a column and row within the output image with a pixel from the input image.

The location of each input image pixel can be converted to a normalized x,y coordinate system and the column and row of each input image pixel may be adjusted such that it lies within the input image width and height, respectively. If the row or column of the input image is less than zero, it may be adjusted to equal zero. If the row is greater than the height of the input image, the row may be adjusted to equal the input image height. If the column is greater than the width of the input image, the column may be adjusted to equal the input image width.

Once the look-up table index is calculated, the table index may be adjusted to equal the input pixel location. For example, the look-up table index column can be adjusted to equal the input pixel column, and the look-up table index row can be set equal to the input pixel row.

The completed look-up table may be used to transform a received hemispherical input image to a rectilinear output image. First, the column and row of a location on the output image should be determined. The input image pixel to be transferred to the particular output location can then be determined from the look-up table based on the row and column of the output image location. The input image pixel may then be transferred to the associated output image location.

In accordance with another embodiment of this invention, the transformation from a hemispherical input image to the rectilinear output image is independent of the optical characteristics of the hemispherical camera and lens. In addition, mapping each pixel to the output image location can be performed such that only one pixel is transferred to a given output image location such that the output image does not contain Moire Effects. However, a single input image pixel may be mapped to multiple output image locations.

In accordance with a further embodiment of this invention, an inspection system utilizing a hemispherical camera producing a data stream representative of a series of input images is provided. An image filter captures each individual hemispherical image within the video stream. An image processor then transforms each captured hemispherical image into an image in rectilinear coordinates. A graphics renderer renders the rectilinear image in real-time.

The surveillance system may also contain a second hemispherical camera. The second camera produces a second data stream representative of a second series of input images. The second camera can be located such that it is offset from the first hemispherical camera. By offsetting the second hemispherical camera, system blindspots are substantially reduced and a viewing area can be captured.

The series of hemispherical images produced by the first and second hemispherical camera may contain a plurality of pixels values associated with address information for display or on a display device. The addresses for displayed data are associated with rows and columns on the display device. Additionally, the rectilinear output image may be associated with a plurality of locations to which the pixels within the hemispherical image will be mapped.

The image processor may also be configured to generate a look-up table containing the locations of pixels located within the hemispherical input image and corresponding locations within the output image. The image processor may transform the hemispherical image to a rectilinear image using the generated look-up table.

DETAILED DESCRIPTION OF SPECIFIC EMBODIMENTS

Figure 1:
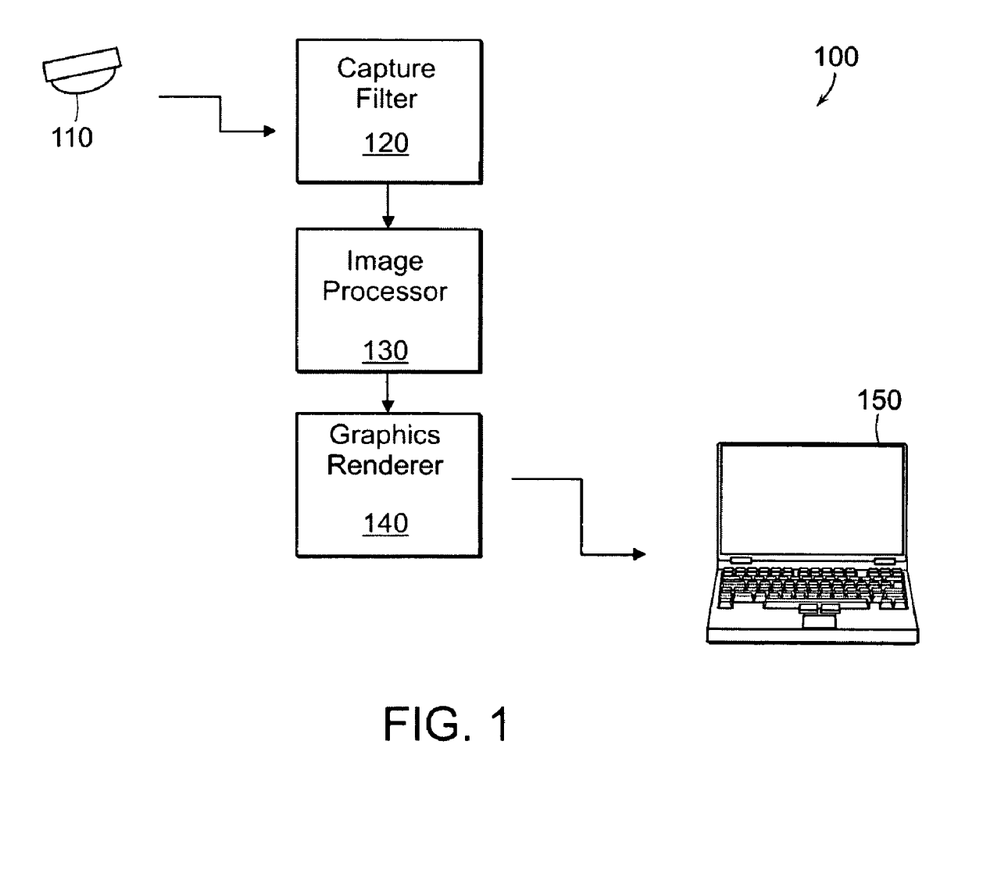
FIG. 1 shows the system configuration of an embodiment of the current invention.
Figure 3:
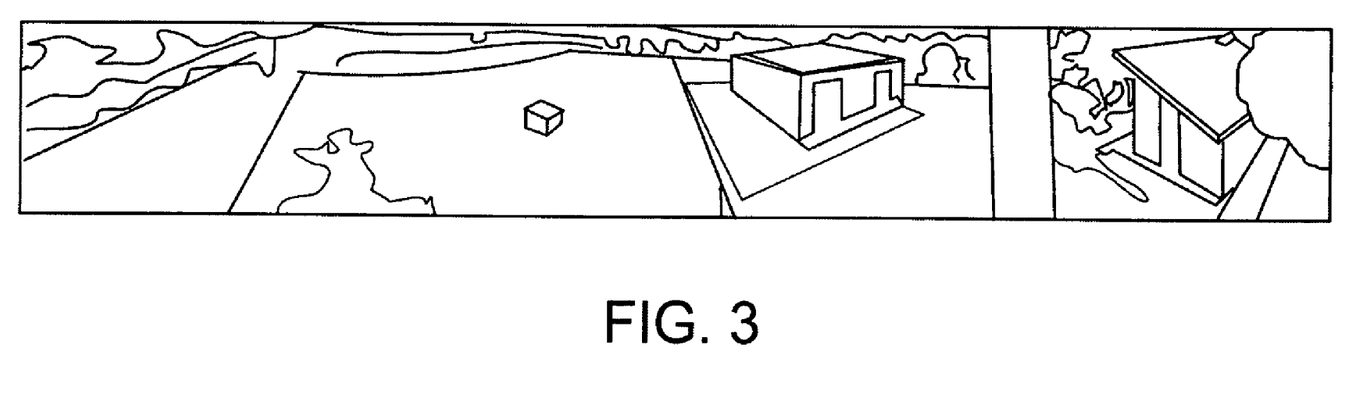
FIG. 3 shows an example of a dewarped rectilinear output image.

FIG. 1 shows a surveillance system 100 in accordance with an embodiment of the present invention. A hemispherical camera 110 captures a video stream containing a series of hemispherical images. Hemispherical camera 110 then transmits the video stream to capture filter 120, which intercepts the video stream and grabs each image. Filter 120 may make hemispherical camera 110 appear as a virtual device even though it does not need to be directly connected to system 100. Image processor 130 then processes the images captured by filter 120. Image processor 130 transforms the captured hemispherical images into rectilinear images. Once the image processor 130 transforms the images, graphics renderer 140 renders the rectilinear images, which may be displayed on computer screen 150 for operator viewing. FIG. 2 shows a sample hemispherical input image. FIG. 3 shows the dewarped rectilinear output image of the hemispherical input image shown in FIG. 2.

Image processor 130 may generate and use a look-up table to transform the hemispherical input image to the rectilinear output image. The look-up table generated by image processor 130 contains the locations of the input image pixels and locations on the output image. When the term "location" is used herein it may reference an address in a display or a position within an image. The term "pixel" refers to data at an addressed position on a display screen or within an image. Image processor 130 may then associate the input pixel coordinates and the output image locations based on their position in the look-up table. The input image pixels are then transferred to the associated location on the output image.

Figure 4:
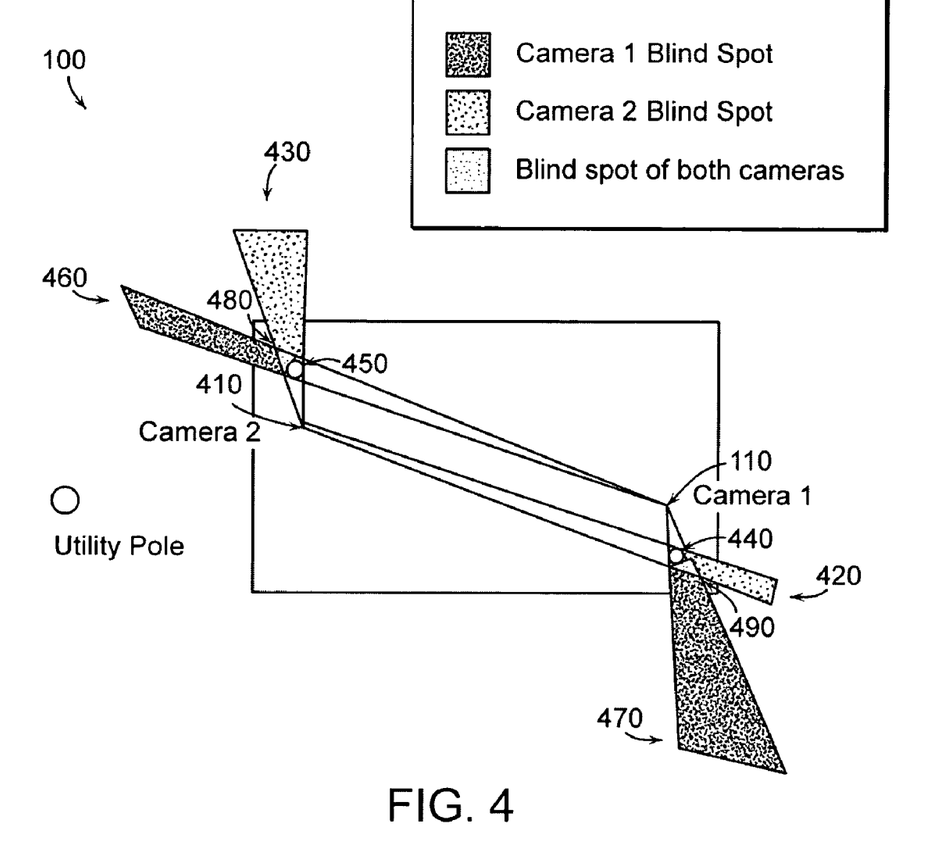
FIG. 4 shows a surveillance system using two cameras and illustrating the blind spots of each camera.

As shown in FIG. 4, in addition to hemispherical camera 110, surveillance system 100 may also include second hemispherical camera 410. For maximum viewing area, second camera 410 may be offset from first hemispherical camera 110. Offsetting hemispherical camera 110 and hemispherical camera 410 will reduce system blindspots. As shown in FIG. 4, hemispherical camera 110 has blindspots 420, 430 caused by obstructions 440, 450. Similarly hemispherical camera 410 has blindspots 460, 470. However, when hemispherical camera 110 and hemispherical camera 410 are offset and used in conjunction with each other, blindspots 420, 430, 460, 470 are substantially reduced and only blindspot 480 and blindspot 490 remain.

Figure 5:
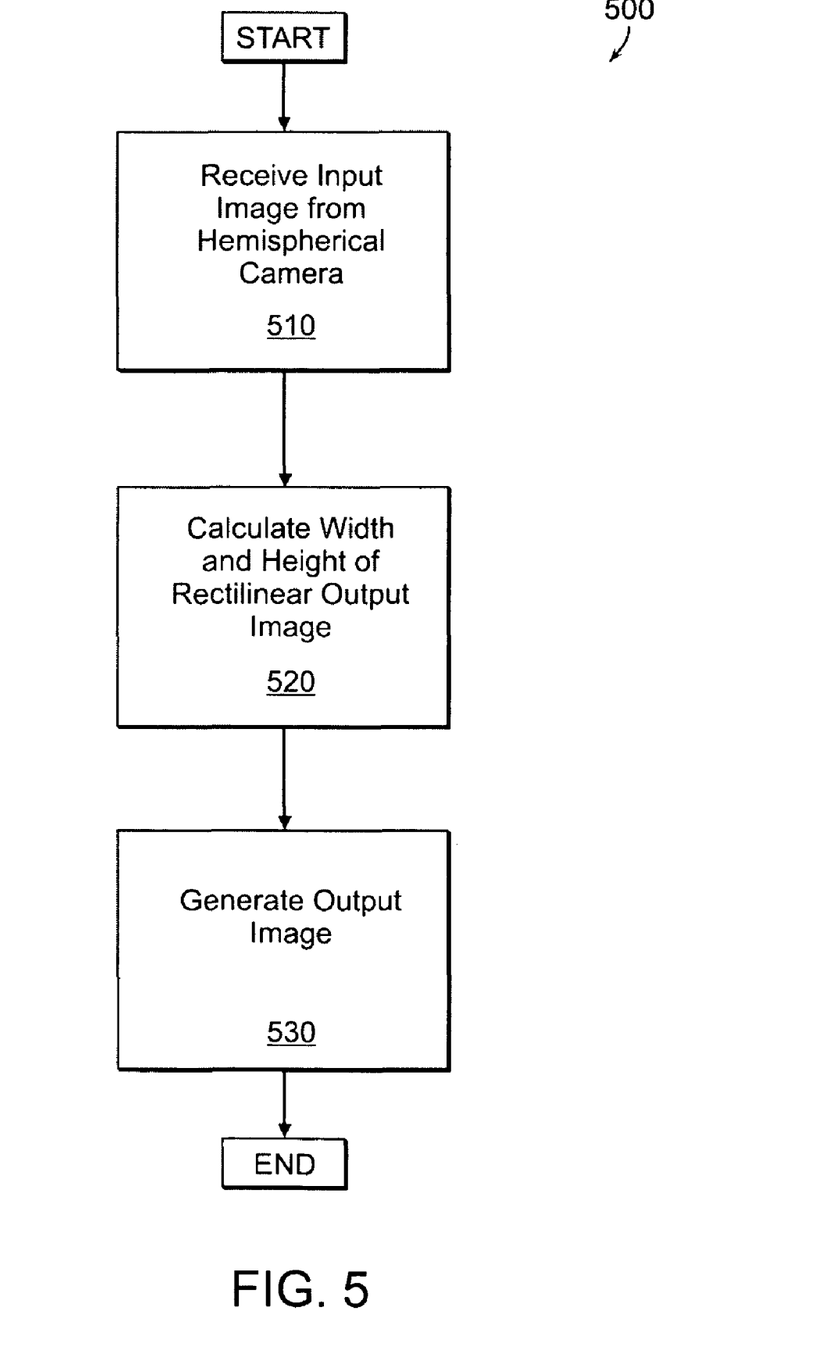
FIG. 5 is a flowchart of the general operation of an embodiment of the system.

FIG. 5 shows a flowchart of the general system process 500. The system receives data from the hemispherical cameras 510. For example, the data may be in JPEG format. The data is representative of a series of hemispherical input image and includes of a number of pixel values associated with address information for display on a display device. The addresses for displayed data are associated with rows and columns on the display device. The number of rows and columns will define the size of the input image (i.e. Rows× Columns). Based on the size of the input image, the system will calculate the size of the output image 520. The size of the output image may be calculated according to the following equations, where the diameter of the input image is equal to the number of rows and the radius is equal to one half of the diameter:

$$\text{Output Image Width} = \pi \times \text{Input Image Radius} + 0.5$$

$$\text{OutputImageHeight} = 0.94 \times \text{InputImageDiameter} + 4.0$$

Once the size of the output image is calculated, the system will generate the output image 530. The output image will be in rectilinear coordinates and can be displayed on computer screen 150, FIG. 4. The rectilinear image is a rectangular, de-warped image if the hemispherical input image.

Figures 6, 6A:
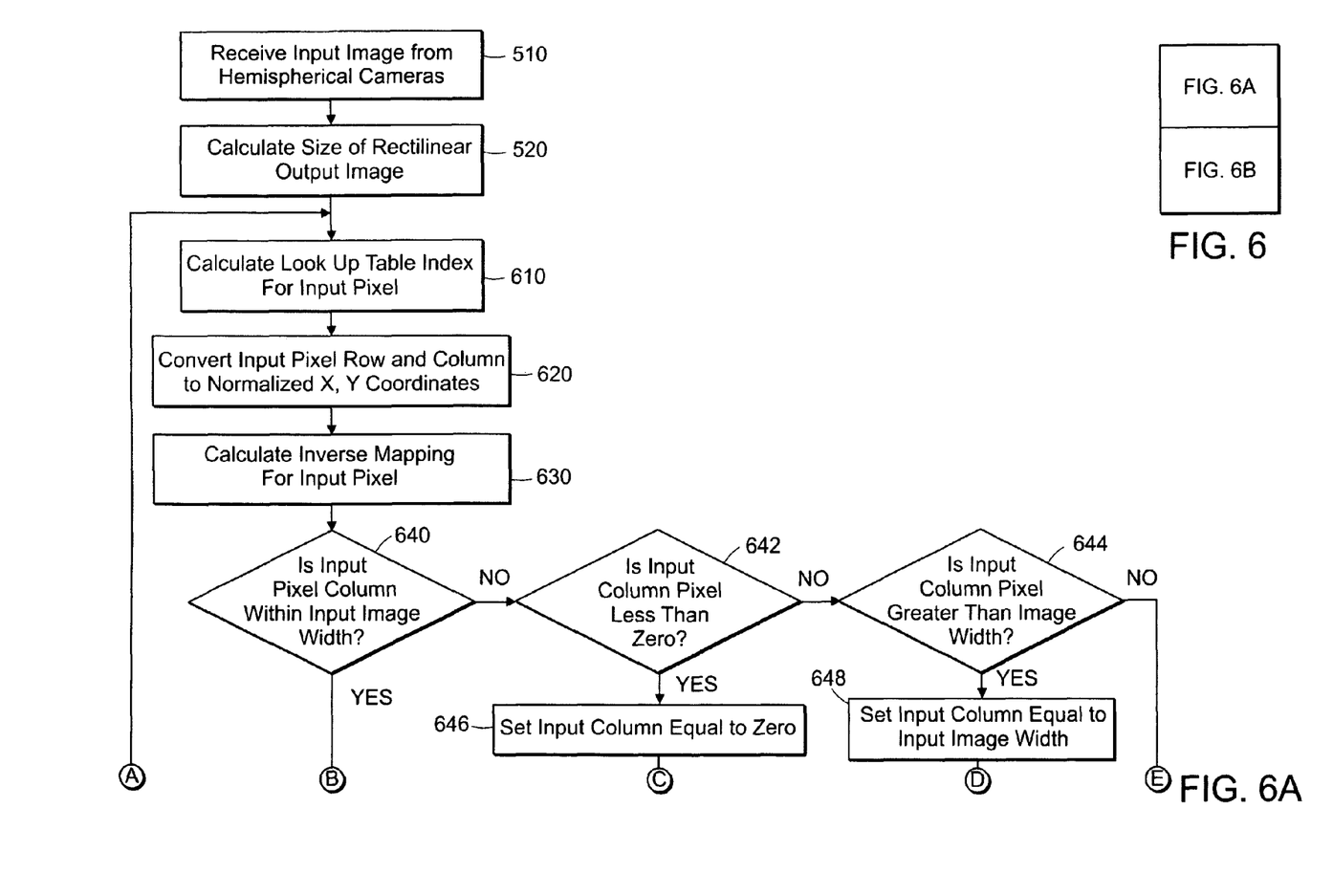
FIG. 6 is a flowchart of how a look-up table may be generated for use with the methodology of FIG. 5.
Figure 6B:
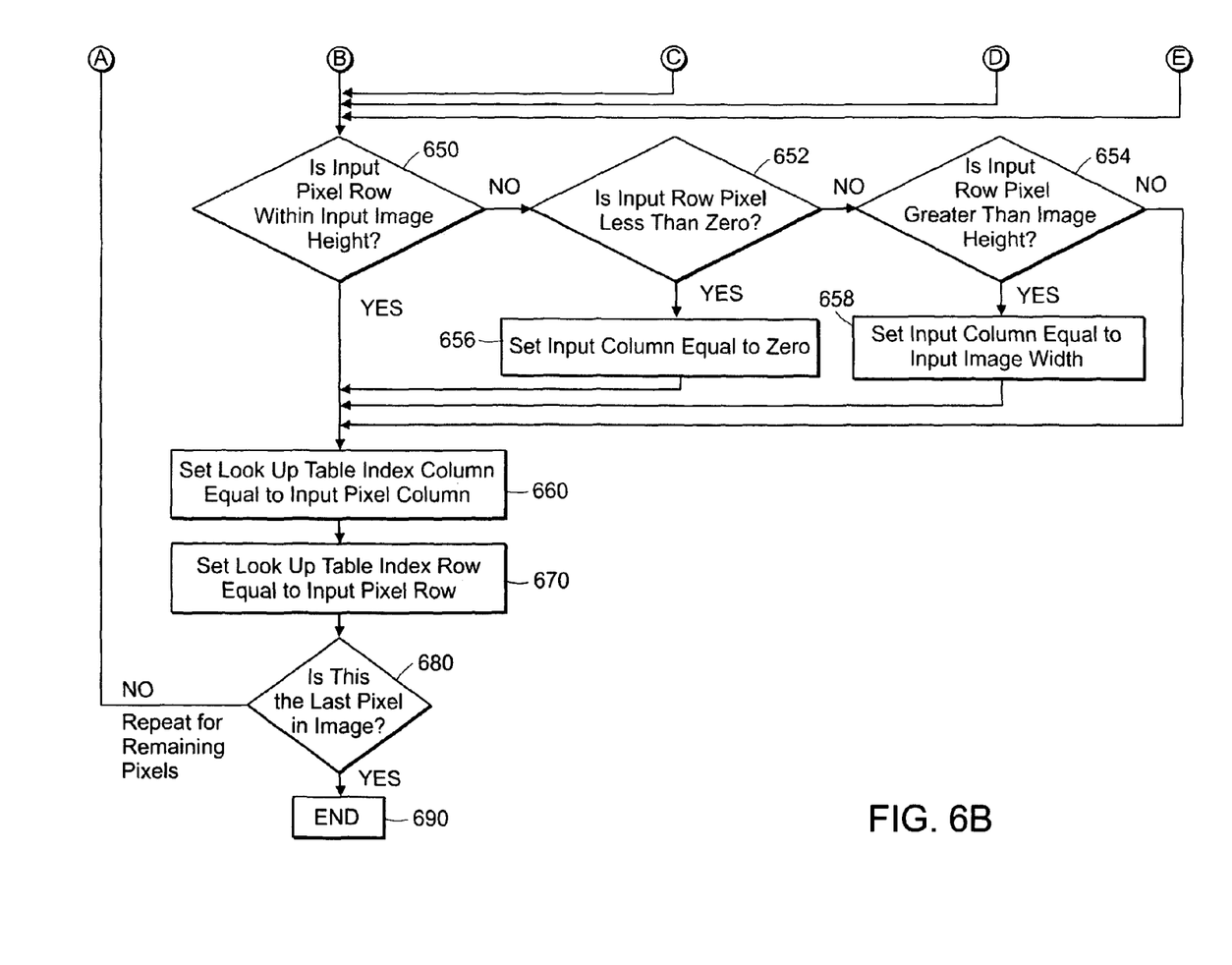

The system may generate and use a look-up table to aide in transforming the hemispherical input image to an output image in rectilinear coordinates. FIG. 6 shows how the system may generate such a look-up table. The system generates the table after the system has received the input image 510 and calculated the size of the output image 520. The first step in the generation of the look-up table is calculating the final look-up table index for each of the input pixels 610. The final look-up table index represents the output row and column in the look-up table. The output row will range from zero to the output height minus one. The output column will range from zero to the output width minus one. Calculating the table index in this manner will flip the image orientation within the table. In other words, column zero of the input image will become the last column in the look-up table and the final column of the input image will become column zero of the table. The system can calculate the final look-up table index according to the following equation:

IndexOut=OutputRow×OutputWidth+(Output Width−1)−OutputColumn

Once the look-up table index is calculated, the system will convert the row and column location of each input image pixel into normalized x,y coordinates 620. In the preferred embodiment, the normalized coordinates will range from −1 to 1 with the center of the hemispherical image located at (0,0). In addition, to preserve the aspect ratio of the output image, the system may divide the normalized x,y coordinates by the maximum image dimension. Specifically, the system can calculate the normalized x,y coordinates using the following set of equations:

$x$=((2×input pixel column)−output image width)÷max output image dimension $y$=((2×input pixel row)−output image height)÷max output image dimension To associate the input image pixel locations with a location within the output image, the system can calculate inverse mapping 630. The inverse mapping is determined by calculating angles Phi and Theta and then using these angles to calculate the normalized coordinates of the input image pixel. The angles Phi and Theta convert the x and y coordinates calculated above into angular coordinates dXNormalizedIn and dYNormalizedIn. The system may then calculate the input row and input column using the normalized angular coordinates. The system can perform the calculations according to the following equations:

Theta=($x$+1.0)×π; where Theta scales from 0.0 to 2π

Phi=($y$+1.0)×0.5×(π÷2), where Phi Scales from 0.0 to π/2 dXNormalizedIn=cos(Theta)×sin(Phi)

dYNormalizedIn=sin(Theta)×sin(Phi)

Input column=dYNormalizedIn×Input Width+(Input Width÷2)+0.5

Input row=dYNormalizedIn×Input Height+(Input Height÷2)+0.5

The system should calculate the inverse mapping 630 for all pixels except for the pixel located at coordinates (0,0). The pixel that is located at the center point (i.e. 0,0) of the input image should be transferred to the center of the output image. In other words, the input column and input row for the center pixels are as follows:

Input Column for Center=(input width÷2)−1

Input Row for Center=(input height÷2)−1

In order to accurately transfer the input image pixels to the output image, the input column and input row calculated above should fall within the input image height and width. If the input column and row fall outside of the input image width and height 640, 650, the system should force them to fall within the image dimensions. If the input pixel column or row are less than zero 642, 652, the system should set them equal to zero 646, 656. If the input pixel column is greater than the image width 644, the system should set the column equal to the width 648. Likewise, if the input pixel row is greater than the image height 654, the system should set the row equal to the input image height 658.

At this point, the system associates the look-up table index calculated above with the pixel locations 660, 670. This system can accomplish this by setting the look-up table index to the input column and row. In other words, the system sets the look-up table index column to the input pixel column 660, and sets the look-up table index row to the input pixel row 670. This allows the system to map the pixels on the input image to a corresponding location on the output image. The system should complete the above mentioned steps for every pixel in the input image 680. Once the system maps the pixels, the table is complete 690.

Figure 7:
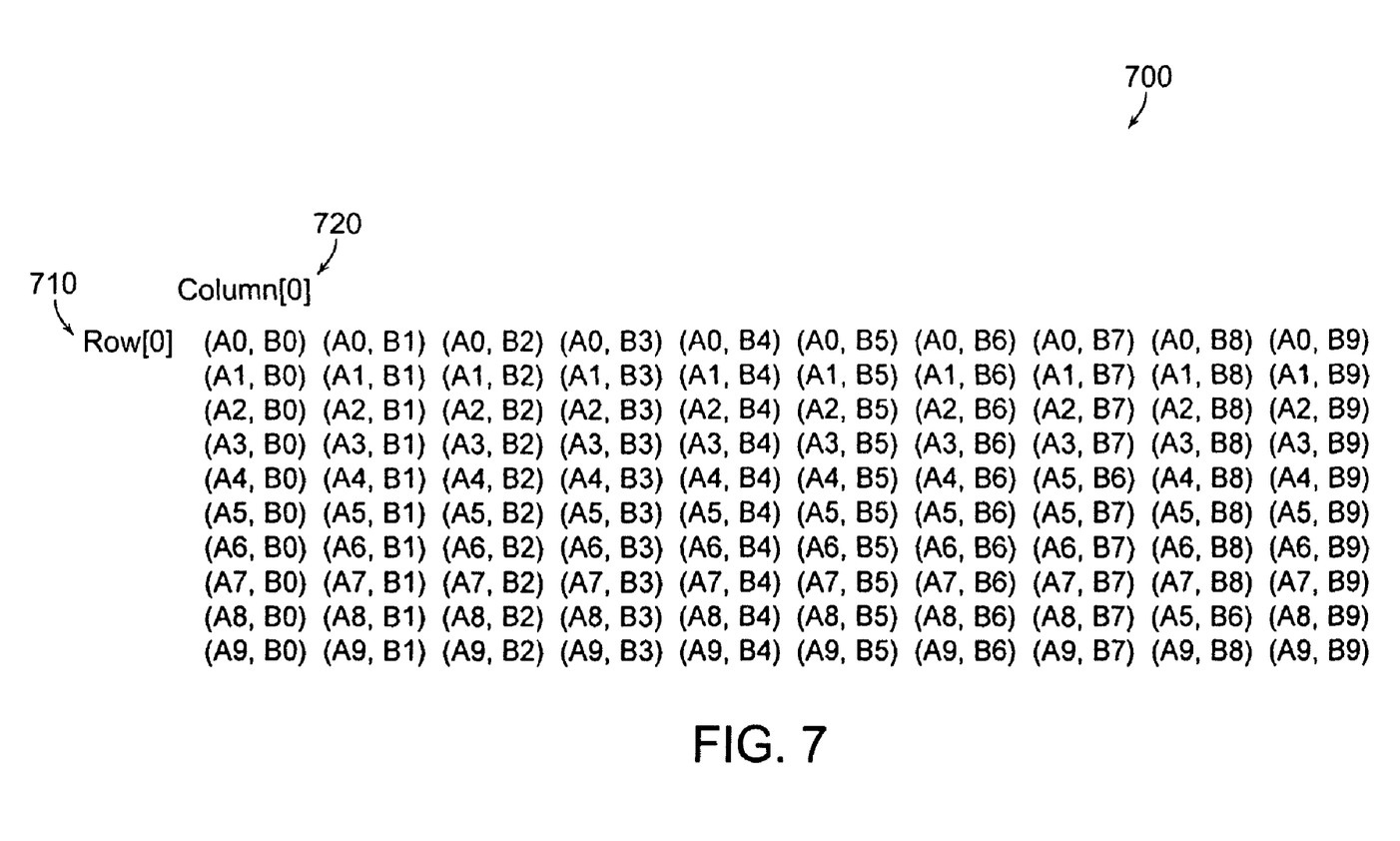
FIG. 7 shows an exemplary look-up table generated in accordance with the present invention.

FIG. 7 shows a portion of an example look-up table in accordance with the present invention. The sample look-up table is for a 10 row by 10 column output image and is for illustration purposes only. A table in accordance with this invention may vary in format and/or size. The table starts with row [0] 710 and column [0] 720 which correspond to the locations within the output image. The values within the table represent input image pixel data locations. To determine the location of where the input pixel should be transferred on the corresponding output image location, the user or system need only look to the appropriate column and row on the look-up table. For example, according to sample table 700 the input image pixel for output row [0] and output column [0] is (A0, B0)

Figure 8:
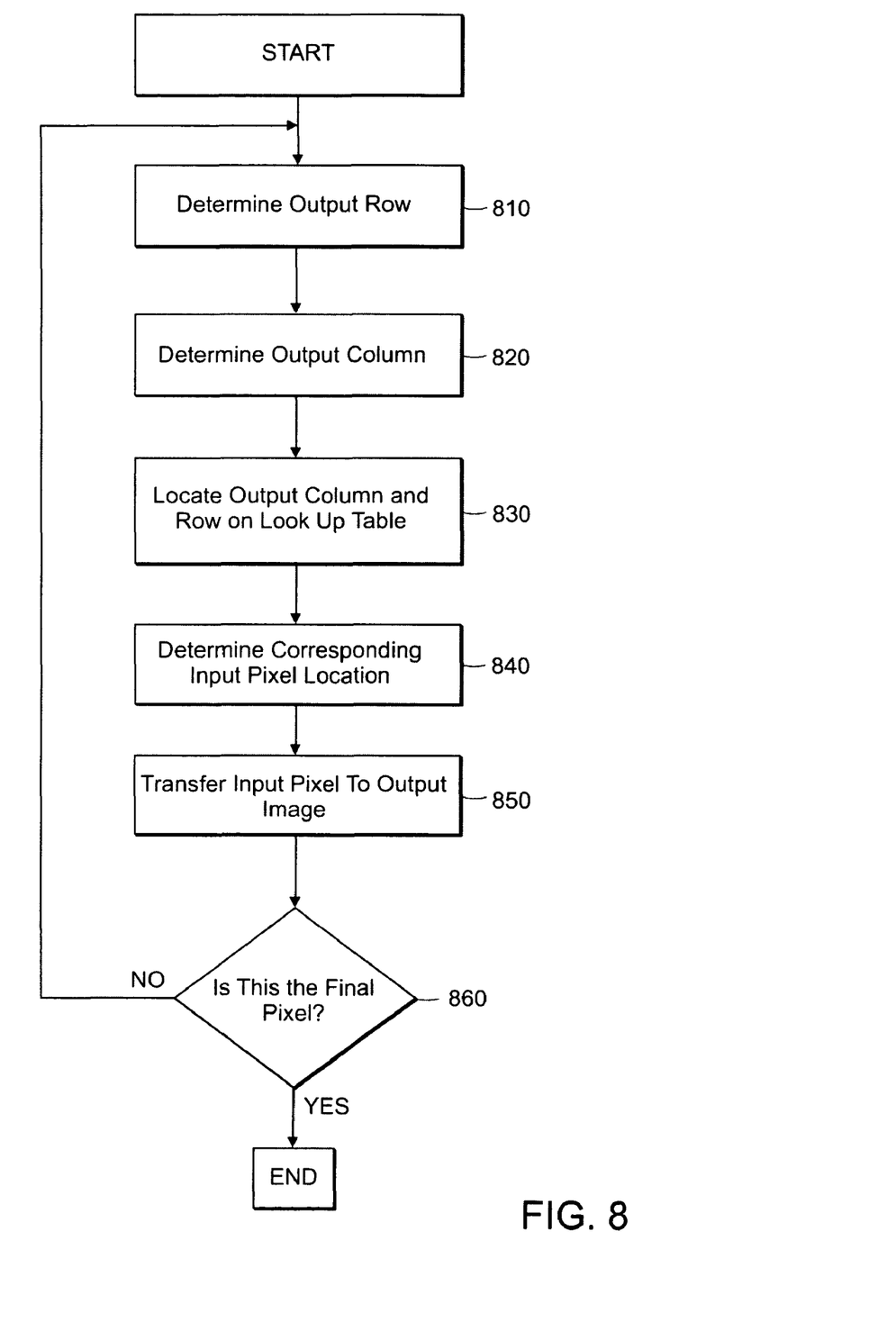
FIG. 8 is a flowchart showing how the look-up table is used to transform the curvilinear input image into an image in rectilinear coordinates using a look-up table.

The system need only generate the look-up table once for each camera for a given image size. Once the system generates the look-up table, the system can use the table to transform future incoming images in real time. FIG. 8 shows how the generated look-up table can be used to transform hemispherical input images to output images in rectilinear coordinates. The first step in using the look-up table to transform the hemispherical image into a rectilinear output image is to determine the current row 810 and column 820 of the output image location. Once the output location is determined, the next step is to locate the output column and row in the look-up table 830. As mentioned above, the look-up table is structured, such that the rows and columns of the look-up table correspond to the row and column within the output image. For example, if the current location within the output image is row one and column one, the corresponding location on the look-up table is also row one, column one. The value in the look-up table at that location is the location of the corresponding input image pixel 840. The pixel at the location shown in the look-up table can then be transferred to the output image location 850. The process can then be repeated for each output image location 860. Each input image pixel may be mapped to multiple locations on the output image (i.e. one to many mapping). However, multiple pixels cannot be mapped to a single location (i.e. many to one mapping), such as in many prior art systems. The one to many mapping used by this invention prevents image distortion such as Moire effects, which are commonly seen images generated using a many to one mapping process. The output image can be in either a RGB or an RGBA format. The RGB format will requires the output image to have 3 bytes per pixel. The RGBA format requires 4 bytes per pixel. The following is exemplary code that may be used to carry out the image transformation using the generated look-up table.

```
for Output Row ranging from 0 to Output Height -1
{
    iRowStartOut = iRowOut * iOutputWidth *
    m_iOutputNumberOfBytesPerPixel;
    for Output Column ranging from 0 to Output Width-1
    {
        iIndexOutTable   = iRowStartOut + iColumnOut;
        iIndexOutPixels  = iRowStartOut + ( iColumnOut *
                           m_iOutputNumberOfBytesPerPixel);
        iRowIn           = LookUpTable[iIndexOutTable].iRow;
        iColumnIn        = LookUpTable[iIndexOutTable].iColumn;
        iIndexInPixels   = (( iRowIn * m_iInputWidth + iColumnIn ) *
                           m_iInputNumberOfBytesPerPixel);
        OutputImage[ iIndexOutTable] = InputImage[ iIndexInPixels];
    }
}
```

Note:
The above statement block copies the correct number of pixel sub-components as expressed in the variable m_iInputNumberOfBytesPerPixel (3 for RGB and 4 for RGBA) from the input image to the output image.

Figure 9:
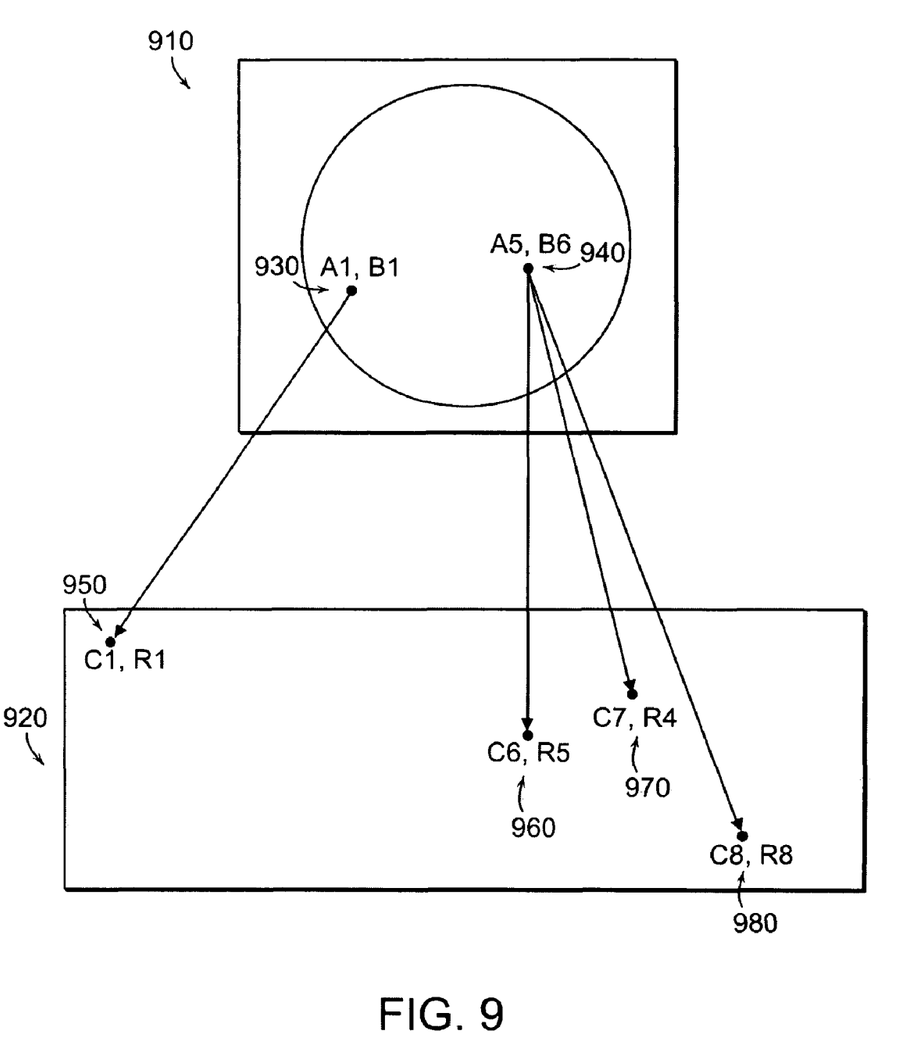
FIG. 9 shows how the input image pixels can be transferred according to the methodology of FIG. 8 and using the exemplary look-up table of FIG. 7.

FIG. 9 shows how the system may transfer input image pixels using the look-up table shown in FIG. 7. Hemispherical input image 910 contains input image pixels 930, 940 located at (A1, B1) and (A5, B6), respectively. Once look-up table 700, FIG. 7, is generated, the system may locate the appropriate column and row on rectilinear output image 920 and determine the associated input image pixel. For example, according to look-up table 700, input image pixel 930 located at (A1, B1) is associated with output image column (C1, R1). Therefore input pixel 930 is transferred to (C1, R1) 950 on output image 920. As mentioned above, the system may map and transfer a single input image pixel to multiple locations on output image 920. Input image pixel 940 is an example of such a pixel. According to look-up table 700 output locations (C6, R5) 960, (C7, R4) 970, and (C8, R8) 980 are all associated with input pixel 940 located at (A5, B6). Therefore, the system will transfer input pixel 940 to all three locations.

In one embodiment, the invention may be implemented as a computer program product for use with a computer system. Such implementation may include a series of computer instructions fixed either on a tangible medium, such as a computer readable media (e.g., a diskette, CD-ROM, ROM, or fixed disk), or transmittable to a computer system via a modem or other interface device, such as a communications adapter connected to a network over a medium. The medium may either be a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable media with accompanying printed or electronic documentation (e.g., shrink wrapped software), preloaded with a computer systems (e.g., on system ROM or fixed disk), or distributed from a server or electronic bulletin board over the network (e.g., the Internet or World Wide Web).

In other embodiments of the invention, the image transformation system may be embodied as hardware or firmware (hardware and software).

Although various exemplary embodiments of the invention have been disclosed, it should be apparent to those skilled in the art that various changed and modifications can be made which will achieve some of the advantages of the invention without departing from the true scope of the invention. These and other obvious modifications are intended to be covered by the appended claims.

What is claimed is:

1. A method of transforming an input image from a hemispherical source to an output image in rectilinear coordinates, the method comprising:
    receiving data representative of an input image originating from a hemispherical camera, and having a size defined by an input image height and an input image width;
    calculating an output image width and an output image height representative of a size of a rectilinear output image based on the size of the input image;
    generating a look-up table containing designated locations of pixels located within the input image and corresponding locations within the output image, wherein generating the look-up table includes:
        calculating an inverse mapping for each input image pixel by determining a location of each input image pixel, wherein the input image pixel location is represented by a column and a row,
        calculating a look-up table index for each input image pixel, the look-up table index containing an association of a column and row within the output image with an input image pixel, and
        adjusting the look-up table index column for each input image pixel such that the look-up table index column is equal to that input image pixel's column; and
        adjusting the look-up table index row for each input image pixel such that the look-up table index row is equal to that input image pixel's row; and
    generating a rectilinear output image by mapping pixels to locations within the width and height of the output image based upon the input image data, using the look-up table, and without reference to the optical characteristics of the hemispherical camera.

2. The method of claim 1, further comprising:
    converting the location of each input image pixel into a normalized x,y coordinate system.

3. The method of claim 1, wherein generating a look-up table further comprises:
    adjusting the column of each input image pixel such that the column lies within the input image width; and adjusting the row of each input image pixel such that the row lies within the input image height.

4. The method of claim 3, wherein adjusting the column of each input image pixel such that each input pixel lies within the initial input image width further comprises:
    adjusting a value for the column of the input image pixel that is less than zero such that the value for the column is equal to zero; and
    adjusting a value for the column of the input image pixel that is greater than the input image width such that the value for the column is equal to the input image width.

5. The method of claim 3, wherein adjusting the row of each input image pixel such that each input pixel lies within the initial input image height further comprises:
    adjusting a value for the row of the input image pixel that is less than zero such that the value for the row is equal to zero; and
    adjusting a value for the row of the input image pixel that is greater than the input image height such that the value for the row is equal to the input image height.

6. The method of claim 1, wherein generating the rectilinear output image further comprises:
using the look-up table to determine the location on the rectilinear output image to which to map the input pixel.

7. A method of generating a reusable look-up table for transforming input images from a hemispherical source to output images in rectilinear coordinates, the method of comprising:
receiving data representative of a first input image into a processor, the data originating from a hemispherical camera, and having a size defined by an input image height and an input image width;
determining, using the processor, a position within the look-up table for the input image pixels, wherein the position within the look-up table represents an output row and column; and
calculating, using the processor, an inverse mapping for each input image pixel by determining a location of pixels within the input image, wherein the location is defined by a column and a row, the reusable look-up table being reusable to transform the first input image and additional input images having defined input image sizes without reference to the optical characteristics of the hemispherical source.

8. The method of claim 7, further comprising:
adjusting, using the processor, the column position in the look-up table for the input image pixels such that it is equal to that pixel's input column; and
adjusting, using the processor, the row position in the look-up table for the input image pixels such that it is equal to that pixel's input row.

9. The method of claim 7, further comprising:
calculating, using the processor, a width and height defining a size of an output image based on the size of the input image.

10. The method of claim 7, further comprising:
converting, using the processor, the location of each input image pixel into a normalized x,y coordinate system.

11. The method of claim 7, further comprising:
adjusting, using the processor, the column of the input image pixels such that the column lies within the initial input image width; and
adjusting, using the processor, the row of the input image pixels such that the row lies within the initial input image height.

12. A method according to claim 7 further comprising:
storing the look-up table in memory for use in converting later received image data originating from a hemispherical camera to a rectilinear output image.

13. A method of transforming an input image from a hemispherical source to an output image in rectilinear coordinates using a reusable look-up table, wherein the input image from the hemispherical source is represented by a size and contains a number of pixels and the rectilinear output image is represented by a size calculated based on the input image size, the method comprising:
determining a location within the output image to transfer each input image pixel, wherein the output image location is represented by a column and a row;
determining an input image pixel associated with the output image location based on the row and column of the output image location using the reusable look-up table, the look-up table including input image pixel data locations; and
transferring the associated input image pixel to the output image location, the reusable look-up table being created based upon image data from a prior hemispherical image, and configured to be used to transform additional input images having defined input image sizes without reference to the optical characteristics of the hemispherical source.

14. A method according to claim 13 further comprising:
rendering, using an graphics renderer, the rectilinear output image; and displaying the rectilinear output image on a screen.

15. A computer program product for use on a computer system for transforming an input image from a hemispherical source to an output image in rectilinear coordinates, the computer program product comprising a non-transitory computer readable medium having computer readable code thereon, the computer readable program code comprising:
computer code for receiving data representative of an input image from a hemispherical camera, and having a size defined by an input image height and input image width;
computer code for calculating an output image width and an output image height representative of a size of a rectilinear output image based on the size of the input image;
computer code for generating a look-up table containing designated locations of the pixels located within the input image and corresponding locations within the output image, wherein the computer code for generating the look-up table includes:
computer code for calculating an inverse mapping for each input image pixel by determining a location of each input image pixel wherein the input image pixel location is represented by a column and a row,
computer code for calculating a look-up table index for each input image pixel, the look-up table index containing an association of a column and row within the output image with an input image pixel,
computer code for adjusting the look-up table index column for each input image pixel such that the look-up table index column is equal to that input image pixel's column, and
computer code adjusting the look-up table index row for each input image pixel such that the look-up table index row is equal to that input image pixel's row; and
computer code for generating a rectilinear output image by mapping pixels to locations within the width and height of the output image based upon the input image data, using the look-up table, and without reference to the optical characteristics of the hemispherical camera.

16. The computer program product of claim 15, wherein the computer code for generating the look-up table further comprises:
computer code for converting the location of each input image pixel into a normalized x,y coordinate system.

17. The computer program product of claim 15, wherein the computer code for generating the look-up table further comprises:
computer code for adjusting the column of each input image pixel such that the column lies within the input image width; and
computer code for adjusting the row of each input image pixel such that the row lies within the input image height.

18. The computer program product of claim 17, wherein the computer code for adjusting the column of each input image pixel such that each input image pixel lies within the initial input image width further comprises:
computer code for adjusting a value for the column of the input image pixel that is less than zero such that the value for the column is equal to zero; and computer code for adjusting a value for the column of the input image pixel that is greater than the input image width such that the value for the column is equal to the input image width.

19. The computer program product of claim 17, wherein the computer code for adjusting the row of each input image pixel such that each input image pixel lies within the initial input image height further comprises:
   computer code adjusting a value for the row of the input image pixel that is less than zero such that the value for the row is equal to zero; and
   computer code for adjusting a value for the row of the input image pixel that is greater than the input image height such that the value for the row is equal to the input image height.

20. The computer program product of claim 15, wherein computer code for generating the rectilinear output image further comprises:
   computer code for using the look-up table to determine the location on the rectilinear output image to which to map the input image pixel.

21. A computer program product for use on a computer system for generating a reusable look-up table for transforming input images from a hemispherical source to output images in rectilinear coordinates, the computer program product comprising a non-transitory computer readable medium having computer readable code thereon, the computer readable program code comprising:
   computer code for receiving data representative of a first input image originating from a hemispherical camera, and having a size defined by an input image height and an input image width;
   computer code for determining a position within the look-up table for the input image pixels, wherein the position within the look-up table represents an output row and column; and
   computer code for calculating an inverse mapping for each input image pixel by determining a location of pixels within the input image, wherein the location is defined by a column and a row, the reusable look-up table being created based upon image data from a prior hemispherical image, and configured to be used to transform additional input images having defined input image sizes without reference to the optical characteristics of the hemispherical source.

22. The computer program product of claim 21, further comprising:
   computer code for adjusting the column position in the look-up table for the input image pixels such that it is equal to that pixel's input column; and
   computer code for adjusting the row position in the look-up table for the input image pixels such that it is equal to that pixel's input row.

23. The computer program product of claim 21, further comprising:
   computer code for calculating a width and height defining a size of an output image based on the size of the input image.

24. The computer program product of claim 21, further comprising:
   computer code for converting the location of each input image pixel into a normalized x,y coordinate system.

25. The computer program product of claim 21, further comprising:
   computer code for adjusting the column of the input images pixel such that the column lies within the initial input image width; and
   computer code for adjusting the row of the input image pixels such that the row lies within the initial input image height.

26. A computer program product for use on a computer system for transforming an input image from a hemispherical source to an output image in rectilinear coordinates using a reusable look-up table, wherein the hemispherical input image is represented by a size and contains a number of pixels and the rectilinear output image is represented by a size calculated based on the input image size, the computer program product comprising a non-transitory computer readable medium having computer readable code thereon, the computer readable program code comprising:
   computer code for determining a location within the output image to transfer each input image pixel, wherein the output image location is represented by a column and a row;
   computer code for determining an input image pixel associated with the output image location based on the row and column of the output image location using the reusable look-up table, the look-up table including input image pixel data locations; and
   computer code for transferring the associated input image pixel to the output image location, the reusable look-up table being created based upon image data from a prior hemispherical image, and configured to be used to transform additional input images having defined input image sizes without reference to the optical characteristics of the hemispherical source.

27. A method of transforming an input image from a hemispherical source to an output image in rectilinear coordinates, the method comprising:
   receiving data representative of an input image into a processor, the data originating from a hemispherical camera, wherein the data is arranged as a number of pixels defining a size including a height and a width;
   calculating, using the processor, a width and height representative of a size of a rectilinear output image based on the size of the input image;
   generating a look-up table containing designated locations of the input image pixels and corresponding locations within the output image, wherein generating the look-up table includes:
      calculating an inverse mapping for each input image pixel by determining a location of each input image pixel wherein the input image pixel location is represented by a column and a row,
      calculating a look-up table index for each input image pixel, the look-up table index containing an association of a column and row within the output image with an input image pixel, and
      adjusting the look-up table index column for each input image pixel such that the look-up table index column is equal to that input image pixel's column; and
      adjusting the look-up table index row for each input image pixel such that the look-up table index row is equal to that input image pixel's row; and
   generating, using the processor, a rectilinear output image by mapping input image pixels to a location within the width and height of the output image based upon the input image data, the look-up table, and without reference to the optical characteristics of the camera.

28. The method of claim 27, wherein generating a rectilinear output image further comprises:
   mapping, using the processor, input image pixels to a location within the width and height of the output image such that only a single input image pixel is mapped to an output image location and the output image does not contain Moire effects.

29. The method of claim 27, wherein generating a rectilinear output image further comprises mapping a single input image pixel to a plurality of locations on the output image.

30. A computer program product for use on a computer system for transforming an input image from a hemispherical source to an output image in rectilinear coordinates, the computer program product comprising a non-transitory computer readable medium having computer readable code thereon, the computer readable program code comprising:

computer code for receiving data representative of an input image originating from a hemispherical camera, wherein the data is arranged as a number of pixels defining a size including a height and a width;

computer code for calculating a width and height representative of a size of a rectilinear output image based on the size of the input image;

computer code for generating a look-up table containing designated locations of the input image pixels and corresponding locations within the output image, wherein the computer code for generating the look-up table includes:

computer code for calculating an inverse mapping for each input image pixel by determining a location of each input image pixel, wherein the input image pixel location is represented by a column and a row,         computer code for calculating a look-up table index for each input image pixel, the look-up table index containing an association of a column and row within the output image with an input image pixel,         computer code for adjusting the look-up table index column for each input image pixel such that the look-up table index column is equal to that input image pixel's column, and         computer code for adjusting the look-up table index row for each input image pixel such that the look-up table index row is equal to that input image pixel's row; and     computer code for generating a rectilinear output image by mapping input image pixels to a location within the width and height of the output image based upon the input image data, the look-up table, and without reference to the optical characteristics of the camera.

31. The computer program product of claim 30, wherein the computer code for generating a rectilinear output image further comprises:

computer code for mapping input image pixels to a location within the width and height of the output image such that only a single input image pixel is mapped to an output image location and the output image does not contain Moire effects.

32. The computer program product of claim 30, wherein the computer code for generating a rectilinear out image further comprises mapping a single input image pixel to a plurality of locations on the output image.

* * * * *